Feb. 24, 1970 G. LEVITE 3,497,422
ELONGATED TUBULAR FLASH EVAPORATOR-CONDENSER
WITH SPACED PARTITIONS
Filed Oct. 6, 1966 2 Sheets-Sheet 1

INVENTOR
GIDEON LEVITE
BY Sughrue & Gonda

ATTORNEYS.

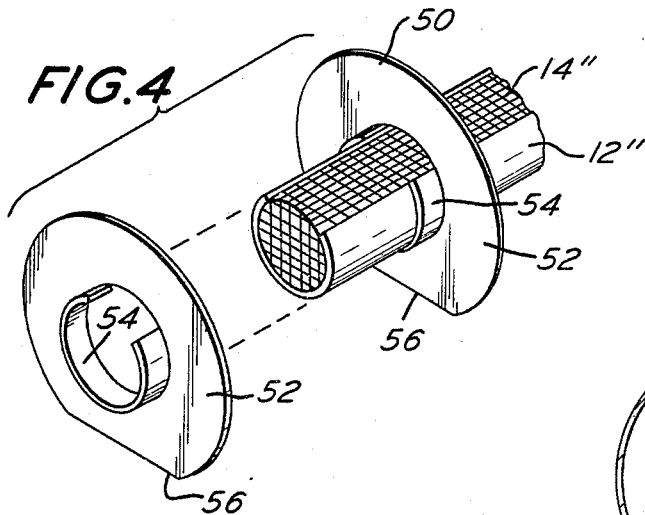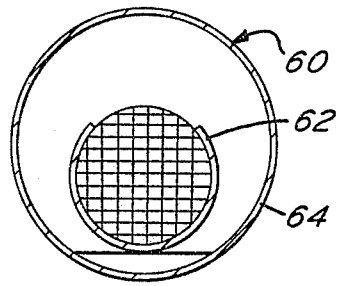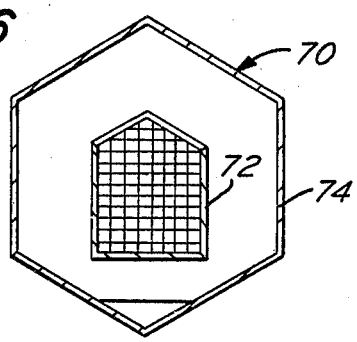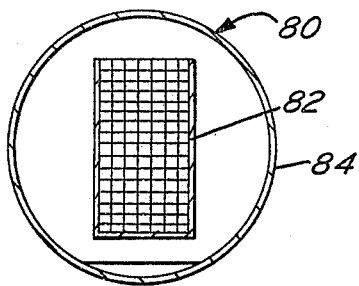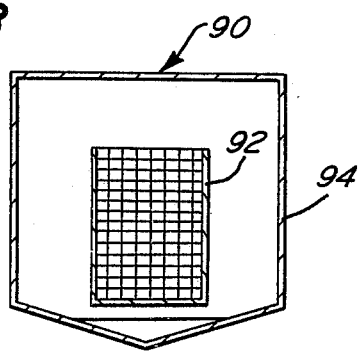

United States Patent Office 3,497,422
Patented Feb. 24, 1970

3,497,422
ELONGATED TUBULAR FLASH EVAPORATOR-
CONDENSER WITH SPACED PARTITIONS
Gideon Levite, Philadelphia, Pa., assignor to Baldwin-
Lima-Hamilton Corporation, Philadelphia, Pa., a corporation of Delaware
Filed Oct. 6, 1966, Ser. No. 584,767
Int. Cl. B01d 3/06, 1/22
U.S. Cl. 202—173                               10 Claims

ABSTRACT OF THE DISCLOSURE

A flash evaporator comprising an elongated channel for conducting liquid distilland is filled with a liquid distilland flow resistant means preferably comprising a porous material packed within the channel for continuously resisting the flow of liquid distilland along the length of the channel. Fins are spaced along the length of the channel and form partitions with a vapor condensing tube that surrounds the channel and is in abutment with the fins. Openings adjacent to the periphery of the fins define flow orifices for condensate. The condenser means is enclosed so that distilland can be moved along its outside and the heat of condensation can be transferred to said distilland prior to being conducted into the channel.

---

This invention relates to a flash evaporator. More particularly, this invention relates to a new and improved method and apparatus for flash evaporation.

Flash evaporation, particularly as applied to the production of fresh from sea water, conventionally employs what is known as the multi-stage flash evaporator. The basic component of a multi-stage flash evaporator comprises an evacuated chamber through which flows the brine being treated. The pressure in the chamber is maintained lower than the saturation pressure of the brine within the chamber, so that in accordance with well-known physical principles, part of the brine flashes off as a vapor or gas. The basic component sometimes also contains a drop eliminator for removing brine droplets that rise with the vapor gases. The vapors are condensed on a bundle of tubes through which incoming recirculated and/or fresh brine is passing. The heat of condensation is transferred to the incoming brine flowing through the condenser tubes. The condensate falls from the tubes into a distillate trough, where it is added to distillate produced in previous stages and conveyed out of the chamber. The unflashed brine is transferred from the flashing chamber through a pressure reducing device to another stage at a lower pressure where vapors are again flashed off from the brine. The brine in the condensate tubes, which may consist of fresh sea water and recycled brine, flows to still another stage at a higher pressure where its temperature is further increased by the heat of condensation of flashed-off vapors. A typical multi-stage flash evaporator will consist of several basic units at successively decreasing pressures in the direction of flashing brine flow and at successively increasing temperatures in the direction of fresh or recycled brine flow.

The conventional multi-stage flash evaporator described above has several disadvantages. The evaporator enclosures are bulky and contain a great deal of unutilized vapor space. The enclosures have to be designed to withstand a complete vacuum even though they may be used at higher pressures. This is because non-condensable vapors in gases must be evacuated before a unit can be started up. Thus, the enclosures are made even bulkier by the addition of heavy reinforcement materials. Still another disadvantage is that at normal operating pressures, which in some stages are below atmospheric, air leakage takes place. This means that additional vacuum pumping equipment must be provided to maintain operating conditions. Still another disadvantage of the prior art multi-stage flash evaporators is the size of the condenser tubes, usually between three-quarter inch and one inch in diameter. These tubes must be seamless of construction, which makes for a relatively high cost heat transfer surface. Yet another disadvantage of multi-stage flash evaporators constructed in accordance with the present state of the art is that they do not lend themselves to mass production. It is not possible to use the same basic modules for distilling plants ranging in capacity over several orders of magnitude.

It therefore is a general purpose of the present invention to overcome or reduce the effect of the foregoing discussed disadvantages.

Thus, it is a general object of the present invention to provide a new and unobvious flash evaporator.

Another object of the present invention is to provide a compact flash evaporator having only a minimum of vapor space.

Yet another object of the present invention is to provide a flash evaporator that operates close to atmospheric pressure.

A further object of the present invention is to provide a flash evaporator that is relatively light in construction and relatively airtight.

Still another object of the present invention is to provide a flash evaporator with condenser tubes of large surface area but relatively low cost.

A further object of the present invention is to provide a basic module for a flash evaporator that can be mass-produced at relatively low cost.

Yet another object of the present invention is provide a low cost basic module for a flash evaporator that can be readily used in multiple components to increase the overall unit capacity of the system.

Other objects will appear hereinafter.

For the purpose of illustrating the invention, there are shown in the drawings forms which are presently preferred it being understood, however, that this invention is not limited to the precise arrangements and instrumentalities shown.

FIGURE 4 is a perspective view of a modified form of the module illustrated in FIGURE 1.

FIGURES 5, 6, 7 and 8 are transverse sectional views of modified forms of the flash evaporator illustrated in FIGURE 1.

Figure 1:
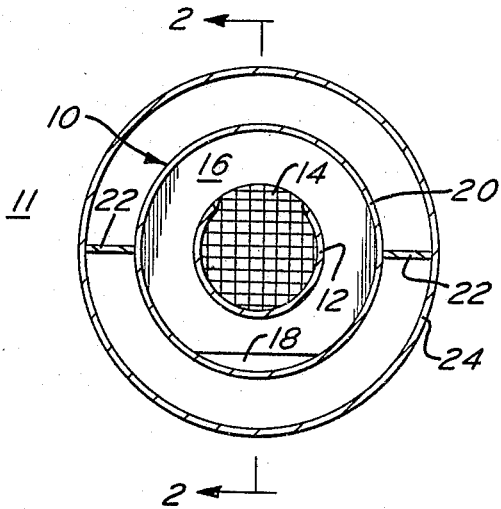
FIGURE 1 is a transverse sectional view of a basic module for the flash evaporator of the present invention.
Figure 2:
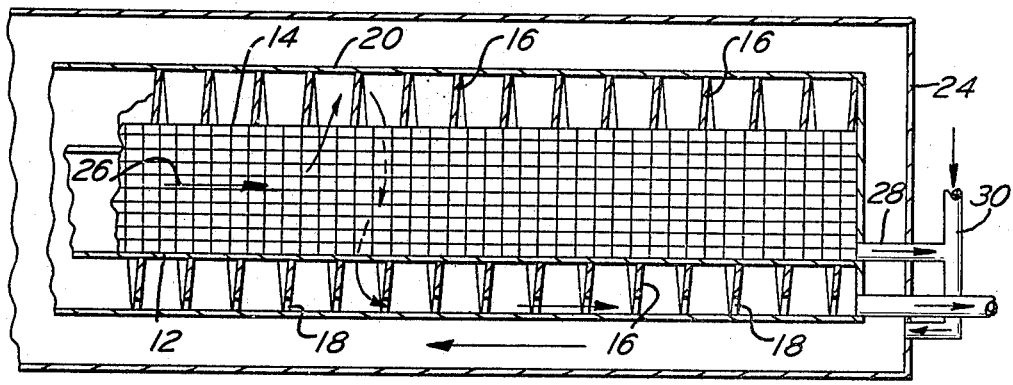
FIGURE 2 is a longitudinal sectional view of the module illustrated in FIGURE 1 taken along the line 2—2.

Referring now to the drawings, wherein like numerals indicate like elements, there is shown in FIGURES 1 and 2 a basic module of the flash evaporator designated generally as 10.

The module 10 includes a channel 12 which in the disclosed embodiment is a semi-cylindrical member made of a strip of sheet metal, as for example, steel. The channel 12 is positioned with its opening at the top thereof and is filled with a porous material 14. The porous material 14 may be any one of a plurality of materials such as wire-mesh, foam glass, plastic foam, or any of the many types of fill material used for packed towers. A thin striplike elastic material, which may be made from steel, copper alloy or plastic, is helically wound about the channel 12 and porous material 14. As thus wound, the helical strip defines fins 16. The method for manufacturing fins 16 can be similar to or the same as the processes used in manufacturing finned tubes for heat exchangers.

A segment is cut from the periphery of each of the fins in the area opposite the opening in channel 12. As best shown in FIGURE 2, the height of each segment cut from the fins successively increases from left to right, or more particularly, in the direction of distillate flow. The fins 16 together with the channel 12 and packing 14 are fitted within a tube 20 which, as will be explained below, forms a heat transfer surface. Moreover, the tube 20 together with the cut-out segments of fins 16 defines a plurality of orifices 18 for the flow of distillate. The tube 20 is preferably made from a good heat conducting material such as a copper alloy. The tube 20 may be of a large diameter, for example, four inches or more, and it may be seam welded. The fins 16 fit tightly against tube 20 and support it, but they need not be absolutely vapor tight.

The elements described thus far define a basic module from which an entire flash evaporation system may be constructed. As shown in FIGURES 1 and 2, the basic module is mounted by brackets 22 within an enclosure 24 to define the complete flash evaporator 11.

The operation of a flash evaporator illustrated in FIGURES 1 and 2 is as follows:

Flashing brine at a high temperature is introduced into the channel 12 so that it is partially filled. The flashing brine is pumped at a high pressure in the direction indicated by the arrow 26. The resistance of the porous material 14 to the flow of the brine through the channel causes a continuous reduction in pressure which in turn causes the brine to flash off as it flows along the channel 12. The vapors flashed from the brine pass upwardly through the unfilled portion of the packing which thus functions as a drop eliminator. Once the vapors escape from the packing 14, they are prevented by the fins 16 from flowing along the annulus between channel 12 and tube 20. But for the fins 16, such flow would occur because of the pressure differential between adjacent fins. The vapors strike tube 20 and condense on the inner surface thereof. The condensed distillate runs down the sides of tube 20 and is collected along the bottom where it flows toward the low pressure end through the orifices 18. The brine flowing along the channel 12 is recycled through a conduit 28 and back towards the high pressure end of the evaporator 10 in the annular area between tube 20 and enclosure 24. If desired, fresh brine can be added through the conduit 30. The recycling brine is gradually heated as it flows from left to right because it is absorbing the heat of condensation removed from the flashed vapors. The flashing brine gradually cools as it flashes off the distillate vapors. The reason for increasing the height of the segments defining the orifices 18 is to increase their area and thereby increase their capacity to pass the distillate.

Figure 3:
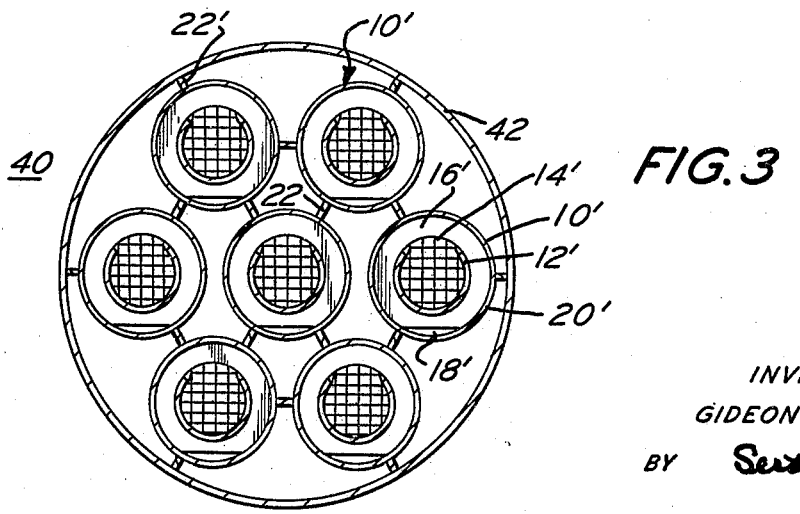
FIGURE 3 is a longitudinal sectional view of the present invention illustrating the use of a plurality of modules to increase the capacity of the system.

Referring now to FIGURE 3, there is shown a second embodiment of the present invention. In this embodiment, the flash evaporator 40 is basically the same as the flash evaporator 11 except that it has been fitted with seven basic modules 10. The enclosure 42 of the evaporator 40 is the same as the enclosure 24, but of a larger diameter. Each of the basic modules comprises a channel 12', packing 14', fins 16', orifices 18', and a heat transfer tube 20'. The modules 10' are supported within the enclosure 42 by a plurality of interconnecting brackets 22'. Although seven basic modules 10' are shown, it should be understood that any number can be accommodated within a single enclosure to provide a flash distillation plant of any required size. The operation of the flash evaporator 40 illustrated in FIGURE 3 is the same as that of the evaporator 11 illustrated in FIGURES 1 and 2, but multiplied seven times.

Referring now to FIGURE 4, there is shown another embodiment of the invention wherein the fins for the basic module 10 are modified. The channel 12" is a semi-cylindrical member filled with a packing 14" as in the embodiment illustrated in FIGURE 1. However, instead of using a helically wound strip to form the fins 16, the channel 12 is fitted with a plurality of individual fins 50. As shown, the fins 50 include a centrally perforated disk member 52 from which depends a semi-cylindrical flange 54 affixed to the channel 12. The fins 50 are segmented at 56 as are the fins 16. The advantage of fins 50 over fins 16 is that they can be individually stamped out from a sheet material and then fitted on the channel 12" with relative ease.

Referring now to FIGURES 5, 6, 7 and 8, there is shown four additional modifications of the basic module of the present invention. In FIGURE 5, the channel 62 is eccentrically mounted with respect to the heat transfer tube 64. This relationship allows for a reduction in the diameter of the heat transfer tube 64.

FIGURE 6 illustrates a basic module 70 which comprises a rectangular channel 72 mounted within a hexagonal heat transfer tube 74. FIGURE 7 illustrates the basic module 80 as having a rectangular channel 82 mounted within a circular heat transfer surface 84. Finally, FIGURE 8 illustrates a basic module 90 as including a rectangular channel 92 mounted within a pentagonal heat transfer surface. All of the foregoing embodiments include segmented fins.

The configurations for the packed brine conducting channels and heat transfer tubes illustrated in FIGURES 5–8 are merely exemplary of the types of configurations that might be chosen, depending upon the required ratio of heat transfer surface to brine flow in the channel, or depending upon the choice of particular manufacturing capacities.

One of the major advantages of the foregoing described flash evaporator is that the surface area of the heat transfer tubes is relatively large in diameter. Moreover, these tubes can be seam welded. Such a construction reduces the unit cost of the heat transfer surface. While the tubes operate with an external overpressure, they are braced from the inside by the fins and need not have a wall thickness that is any larger than the condenser tubes used in the prior art.

The present invention may be embodied in other specific forms without departing from the spirit or essential attributes thereof and, accordingly, reference should be made to the appended claims, rather than to the foregoing specification as indicating the scope of the invention.

I claim:

1. A basic module for a flash evaporator comprising, a liquid distilland conducting tubular member, liquid distilland flow resistance means within said conducting member for resisting the flow of fluid along the length of said conducting member, an opening in said member for the release of flashed vapors from said conducting member, a plurality of partitions spaced along said conducting tubular member and extending radially outwardly from the periphery of said tubular conducting member, vapor condensing means for condensing flashed vapors, said vapor condensing means comprising a tube in abutment with the periphery of said partitions.

2. The basic module of claim 1 including an enclosure for enclosing said condenser means and for conducting a heat transfer fluid past said condenser means.

3. A flash evaporator comprising a plurality of basic modules as defined in claim 1, and means enclosing said basic modules for conducting a heat transfer fluid past said basic module condenser means.

4. A flash evaporator in accordance with claim 1 wherein condensate openings increasing in size in the direction of condensate flow are provided adjacent the periphery of said partition, said condensate openings cooperating with said housing to define flow orifices for condensate.

5. A flash evaporator comprising a liquid distilland conducting tubular member, liquid distilland flow resistance means within said conducting member for resisting the flow of liquid distilland along said conducting member, an opening in said conducting member for the release of flashed vapors, vapor condenser means surrounding said conducting member and comprising a tubular wall spaced outwardly thereof for condensing flashed vapors, housing means enclosing said condenser means for conducting a heat transfer fluid past said condenser means, and means for removing condensed vapors from said flash evaporator.

6. A flash evaporator in accordance with claim 5 wherein said liquid distilland flow resistance means is a packing of porous material contained within said liquid distilland conducting member for continuously resisting the flow of liquid distilland.

7. A flash evaporator comprising a liquid distilland conducting tubular channel, liquid distilland flow resistance means comprising a porous material packed within said channel for resisting the flow of liquid distilland along the length of said channel, a portion of said liquid distilland flow resistance means defining a drop eliminator, partition fins spaced along and helically wound about the periphery of said conducting channel, vapor condenser means for condensing flashed vapors, said vapor condensing means comprising a tube in abutment with the periphery of said fins, openings adjacent the periphery of said fins, said openings cooperating with said tube to define flow orifices for vapor condensate, and means comprising an outer tubular wall enclosing said condensing tube for conducting a heat transfer fluid over said condensing tube.

8. A flash evaporator comprising an elongated liquid distilland conducting tubular member generally horizontally disposed, liquid distilland flow resistance means within said conducting member providing a tortuous path for continuously resisting the flow of liquid distilland along said member, said member having an elongated opening in the upper portion thereof for releasing flashed vapors, a vapor condenser means comprising an outer tubular wall surrounding said distilland conducting member for condensing flashed vapors, housing means surrounding said condenser means for conducting a heat transfer liquid along said condenser means, a plurality of partitions at spaced locations along said conducting member and extending between the outer peripheral wall of said conducting member and the condenser means, and means for removing condensed vapors from the condenser tubular wall means, said condensed vapor removing means including openings in said partitions adjacent the bottom of partitions, the size of the openings increasing in the direction of flow of distilland along said conducting member.

9. A flash evaporator in accordance with claim 8 wherein said distilland conducting member is a channel having a continuous opening along its upper portion to define said opening for release of flashed vapors, and the inner periphery of said condenser means cooperating with said partition to define the opening through which condensed vapors flow from the condenser means.

10. A flash evaporator in accordance with claim 8 comprising a plurality of parallel distilland conducting members each surrounded by a condenser means and disposed within said housing means.

References Cited

UNITED STATES PATENTS

| | | |
|---|---|---|
| 2,994,647 | 8/1961 | Williamson et al. 203—11 X |
| 3,160,571 | 12/1964 | Mulford et al. 202—173 |
| 3,197,386 | 7/1965 | Lau 202—173 |
| 3,214,349 | 10/1965 | Kehoe et al. 203—11 |
| 3,240,683 | 3/1966 | Rodgers 202—173 |
| 3,251,397 | 5/1966 | Lens 202—174 X |
| 3,281,334 | 10/1966 | Williamson 202—173 |
| 3,326,280 | 6/1967 | Bosquain et al. 202—173 X |
| 3,330,739 | 7/1967 | Roe et al. 203—11 X |

NORMAN YUDKOFF, Primary Examiner

F. E. DRUMMOND, Assistant Examiner

U.S. Cl. X.R.
202—187, 236